(12) United States Patent
Irvine et al.

(10) Patent No.: US 8,262,896 B2
(45) Date of Patent: *Sep. 11, 2012

(54) STEAM ELECTROLYSIS

(75) Inventors: John Thomas Sirr Irvine, Anstruther (GB); Angela Kruth, Aberdeen (GB); Cristian Daniel Savaniu, St. Andrews (GB); Shanwen Tao, St. Andrews (GB)

(73) Assignee: The University Court of the University of St. Andrews, St. Andrews (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/044,896

(22) Filed: Mar. 10, 2011

(65) Prior Publication Data

US 2011/0210010 A1 Sep. 1, 2011

Related U.S. Application Data

(63) Continuation of application No. 10/594,655, filed as application No. PCT/GB2005/001169 on Mar. 24, 2005, now Pat. No. 7,906,006.

(30) Foreign Application Priority Data

Mar. 26, 2004 (GB) .................................. 0406818.5
Dec. 14, 2004 (GB) .................................. 0427329.8

(51) Int. Cl.
*C25B 1/02* (2006.01)

(52) U.S. Cl. ......................... 205/637; 205/628; 205/629

(58) Field of Classification Search .................. 204/252, 204/262, 263, 266; 205/637, 628, 629
See application file for complete search history.

(56) References Cited

U.S. PATENT DOCUMENTS 7,906,006 B2 * 3/2011 Irvine et al. ................... 205/637
2002/0081762 A1 6/2002 Jacobson et al.

FOREIGN PATENT DOCUMENTS

EP 0 472 922 A 4/1992

OTHER PUBLICATIONS

International Search Report for corres. PCT/GB2005/001169 completed Jul. 19, 2005 by G. Hammerstein of the EPO.
Iwahara H: "*Technological Challenges in the Application of Proton Conducting Ceramics*"; Solid State Ionics, North Holland Pub. Company, Amsterdam, NL, vol. 77, Apr. 1995, pp. 289-298, XP004050460, ISSN: 0167-2738; paragraph 03.5.
Schneller, T et al: "*Chemcial Solution Deposition Prepared Dense Proton Conducting Y-Doped BaZrO3 Thin Films for SCFC and Sensor Devices*"; Solid State Ionics, North Holland Pub. Company, Amsterdam, NL, vol. 164, No. 3-4, Nov. 2003, pp. 131-136, XP004473999, ISSN: 0167-2738; p. 131, left-hand column, line 1-p. 131, right-hand column, line 5.
Iwahara H. et al: "*Proton Conduction in Sintered Oxides Based on BACE03*"; Journal of the Electrochemical Society, Electrochemical Society, Manchester, NH, US, vol. 135, No. 2, Feb. 1, 1988, pp. 529-533, XP000073186, ISSN: 0013-4651, "Experimental"; abstract.
Valkenberg S et al: "*The Electrical Conductivity of the High Temperature Proton Conductor Ba3Cal.18Nb1.8209-delta*"; Solid State Ionics, North Holland Pub. Company, Amsterdam, NL, vol. 97, No. 1-4, May 1, 1997, pp. 511-515, XP004126222, ISSN: 0167-2738; p. 511, left-hand column, line 1-p. 512, left-hand column, line 13.

* cited by examiner

Primary Examiner — Bruce Bell

(57) ABSTRACT

The present invention relates to a method of producing hydrogen comprising: contacting steam 20 with a proton conducting membrane 7 supported on a porous redox stable substrate 8, through said substrate 8. The membrane 7 is non-permeable to molecular gas and to oxide ions. A DC voltage is applied across an anode 15 coupled to the substrate side of the membrane and a cathode 9,11 coupled to its other side so as to dissociate at least part of the steam 20, into protonic hydrogen and oxygen at said anode 15. The protonic hydrogen passes through the membrane and forms molecular hydrogen 23 at the cathode 9, 11.

18 Claims, 4 Drawing Sheets

US 8,262,896 B2

STEAM ELECTROLYSIS

RELATED APPLICATIONS

The present application is a continuation application of U.S. patent application Ser. No. 10/594,655 filed Jun. 27, 2007 now U.S. pat. No. 7,906,006, which is a national phase application of PCT International Application No. PCT/GB2005/001169, filed Mar. 24, 2005, which claims priority to Great Britain Application No. GB0406818.5 filed on Mar. 26, 2004 and Great Britain Application No. GB0427329.8 filed on Dec. 14, 2004, the subject matters of all of which are hereby incorporated by reference in their entirety.

BACKGROUND OF THE INVENTION

The present invention relates to hydrogen production, and more particularly to hydrogen production by high temperature steam electrolysis with improved efficiency and reduced cost.

Hydrogen is becoming an increasingly important fuel. Various processes have been developed for producing it including inter alia, steam reforming of natural gas and by coal gasification, and water electrolysis. Existing processes do, however, suffer from various disadvantages including relatively low efficiency and high production costs.

It is an object of the present invention to avoid or minimize one or more of the above-mentioned disadvantages.

It has now been found that by using a proton conducting electrolyte membrane, which is substantially non-permeable to oxide ions and to molecular gas, and is stable at high temperatures, it is possible to dissociate water into hydrogen and oxygen and at the same time separate the hydrogen from the oxygen.

SUMMARY OF THE INVENTION

Thus in one aspect the present invention provides a method of producing hydrogen comprising: providing a steam feed stream, contacting said steam feed stream with a proton conducting membrane supported on a porous redox stable substrate, through said substrate, said membrane being substantially non-permeable to molecular gas and to oxide ions, applying a DC voltage across an anode coupled to the substrate side of said membrane and a cathode coupled to the other side of said membrane so as to dissociate at least part of said steam feed stream therebetween, into protonic hydrogen and oxygen at said anode, allowing said protonic hydrogen to pass through said membrane and form molecular hydrogen at said cathode, and collecting said molecular hydrogen.

In another aspect the present invention provides a steam electrolyser for producing hydrogen, comprising: a dense proton-conducting membrane substantially non-porous to molecular gas, said membrane being supported on a gas permeable, chemically and mechanically stable, electronically conducting substrate, said membrane being coupled: at the substrate-supported side to an anode for connection to a positive voltage, and to a steam inlet and oxygen outlet for feeding a steam feed stream into said substrate and exhausting oxygen gas released therefrom; and at its other side to a cathode for connection to a negative voltage and a hydrogen gas outlet for exhaustion of hydrogen gas released at said cathode.

It should be noted that in the simplest case the anode may simply form part of the substrate adjoining the membrane where a suitable substrate is employed i.e. where the substrate material is electrochemically active. Alternatively the anode may comprise a thin layer of a different material interposed between the membrane and the substrate support.

With the present invention the hydrogen production process is substantially simplified, whilst having a relatively high efficiency, and uses apparatus of relatively economic construction. The process provides hydrogen gas which is free from oxygen, steam and other gases, thereby avoiding the need for any downstream separation of gases. Also the electrolysis and separation out of hydrogen gas, may be achieved without the need for any expensive precious metal catalysts or the like.

Various proton-conducting materials are known in the art which are stable to a greater or lesser extent at high temperatures. In general steam electrolysis is carried out at temperatures of around 900 to 1000° C. A particular advantage of the present invention is, however, that steam electrolysis can be carried out at significantly lower temperatures, for example, from 500 to 700° C., whereby the materials and construction used may be significantly simplified and reduced in cost. In general suitable proton-conducting materials comprise a material which allows the reversible dissociation of water into its lattice to form mobile protonic carriers therein. Such materials are frequently oxygen deficient perovskites of formula $ABO_{3-d}$ wherein A and B represent metallic elements occupying the A and B sites of the perovskite lattice structure and $\delta$ represents the degree of oxygen deficiency.

Particular preferred materials which may be mentioned include "$BaCe_{0.9}Y_{0.1}O_{2.95}$ (BCY10), $BaZr_{0.9}Y_{0.1}O_{2.95}$ (BZY) and members of the solid solution, $BaCe_{0.9-x}Zr_xY_{0.1}O_{2.95}$ (BCZY), or the analogues of the previously mentioned phases with lanthanides such as Gd, Nd or Yb instead of Y and such phases with higher degrees of substitution such as $BaCe_{0.8}Y_{0.2}O_{2.95}$ (BCY20), $Sr_3CaZr_{0.5}Ta_{1.5}O_{8.75}$ (SCZTO) and $Ba_3Ca_{1.18}Nb_{1.82}O_{8.73}$ (BCN18) as well as composites of such materials. Thus, for example, there may be used a membrane comprising a layer of BCY10 which has relatively high electrochemical performance (in terms of proton conduction) in contact with the substrate on the hydrogen side, with an outer protective layer of SCZTO which has better stability—especially against chemical degradation by atmosphere $CO_2$. Similarly on an oxidising-side supported electrolyte the $BaCe_{0.9}Y_{0.1}O_{2.95}$ (BYC10) may be protected from the high steam atmosphere by a layer of a material such as SCZTO or BZY.

As indicated above, it is also important that the membrane should be substantially impermeable to molecular gas. Accordingly the membrane material needs to be in a substantially dense, non-porous, form. The membrane is also substantially impermeable to oxide ions.

In order to maximize the efficiency of the electrolyser, the resistivity of the membrane should be kept as low as possible. Desirably therefore the membrane should be as thin as is reasonably practicable. Preferably the membrane thickness is not more than 25 μm, advantageously from 1 to 25 μm, most preferably from 3 to 15 μm.

It is also important that the membrane should remain stably attached to the substrate support under the high temperature operating conditions of the electrolyser. Various methods are known in the art for forming thin films on substrates including inter alia: sol-gel techniques in which a liquid suspension is applied to a substrate, dried and then cured; tape casting in which the membrane material is provided in a powder form embedded inside a polymer tape which is placed on the surface of the substrate and heat treated to form a substantially continuous film of membrane material; vacuum deposition in which the membrane material is provided in a powder form suspended in a liquid carrier is placed on the surface of the substrate and drawn into the surface thereof by means of a vacuum applied to the remote side of the porous substrate, and then heat treated to form a substantially continuous film of membrane material at the substrate surface; etc. It will be appreciated in relation to such processes that, in accordance with normal practice, the particle size of the membrane material applied to the surface of the porous substrate should not be significantly less than the pore size of the substrate, in order to minimize penetration of the particles into the interior of the substrate. Using such techniques we have successfully obtained proton conducting ($Sr_3CaZr_{0.5}Ta_{1.5}O_{8.75}$) membrane films on porous conductive substrates (Ni:YSZ and LSM, $La_{0.8}Sr_{0.2}MnO_3$) with film thicknesses in the range from 3 to 100 microns, depending on the number of layers deposited.

Membranes of $BaZrO_3$-based materials are especially preferred as these are stable and exhibit high proton conductivity. Those materials have, though, to be sintered at a temperature above 1600° C. which makes it very difficult to find suitable electrode materials which have so high a melting point without undergoing significant chemical reactions with the $BaZrO_3$-based electrolyte. By using a sintering aid such as ZnO, it is, however, possible to reduce substantially the sintering temperature, whilst still obtaining a high density product and substantially maintaining the desirable properties of high proton conductivity and stability. More particularly we have found that by using a relatively small amount of ZnO—typically around 1% w/w, it is possible to reduce the sintering temperature of $BaZr_{1-x}Y_xO_{3-x/2}$ from around 1700° C. to around 1300° C., albeit desirably a sintering temperature of at least 1350° C. should normally be used, and obtain a high density material with a relative density of the order of 96%.

In general suitable sintering aids comprise $Al_2O_3$, $Bi_2O_3$ and some first row transition elements oxides such as $TiO_2$, $Fe_2O_3$, CoO, CuO etc, which are commonly used as sintering aids for obtaining dense ionic conducting materials such as yttria stabilised zirconia (YSZ) and ceria doped with gadolinia (CGO).

In order to have a significant effect in reducing the sintering temperature, it is generally necessary to use a minimum amount of the sintering aid. This can be readily determined by trial and error and is typically of the order of from 0.1 to 0.5% w/w. In order to avoid significant distortion of the membrane material structure and adverse effects on the proton-conducting and stability properties thereof, it is generally desirable that the amount of sintering aid should be minimized—whilst still maintaining a useful sintering temperature reduction. Desirably there should be used not more than 5% w/w, preferably not more than 2% w/w, of sintering aid.

The sintering mechanism is typically due to the formation of low melting phases between the sintering aid and constituent oxides, which lower the sintering temperature. Alternatively the sintering aid enters the oxide lattice and produces a lower melting phase that sinters more readily. In either mechanism the sintering aid may be lost on sintering. Without in any way wishing to restrict the scope of the present invention, it is believed that in this case it seems that the sintering aid acts as a dopant that essentially replaces some of the B-site ions and the solid solution $BaZr_{1-x-z}Y_xM_zO_{3-z-x/2}$ forms wherein M represents a dopant metal and Z represents the level of B-site ion replacement and is typically in the range from 0.05 to 0.25, preferably at least 0.1. Suitable dopants include one or more oxides of M=Al, Ti, Bi, B, Mn, Mg, Zn, Co, Ni, Fe, Cu, especially Zn. The mentioned elements may be added into the materials in the form of oxide, carbonate, nitrate, chloride, carbide, nitride, etc and, through any method such as solid state reaction, sol-gel process or any form and technology known as the art. It will be appreciated that some sintering aids are more effective than others and that some sintering aids will require higher concentrations thereof. In this connection Zn doped oxides are particularly good low temperature sintering aids. Preferably substantially pure ZnO is used. In general the amount of dopant used may be from 0.1 to 5% w/w, preferably 0.5 to 3% w/w. In the case of ZnO there is conveniently used about 1% w/w of the ZnO.

The use of such sintering aids is similarly beneficial with other membrane material such as Barium Yttrium Cerate and especially Barium Yttrium Cerate Zirconate which combines stability and conductivity performance.

Various porous electrically conducting materials which are stable at the elevated temperatures used in steam electrolysers are already known in the art, and may be used for the substrate support in the present invention. Suitable materials generally comprise a metallised ceramic or a mixed conductive oxide having an electrical conductivity of not less than 10 $Scm^{-1}$, preferably not less than 100 $Scm^{-1}$, at the operating temperature of the steam electrolysis. Particular suitable substrate materials which may be mentioned include metallised ceramics such as $Cu:Al_2O_3$ or mixed conductive oxides such as $La_{0.8}Sr_{0.2}MnO_3$ (LSM), chromium-doped LSM (i.e. $La_{0.75}Sr_{0.25}Cr_{0.5}Mn_{0.5}O_3$) or $La_{0.6}Sr_{0.4}CO_{0.2}Fe_{0.8}O_{3-d}$ (LSCF).

As indicated above, the substrate support requires generally to be sufficiently porous to facilitate penetration of the steam molecules to the membrane and to facilitate exhaustion of oxygen molecules exiting from the membrane. In general therefore the pore size should be not less than 0.5 μm, and conveniently from 0.5 to 10 μm. Desirably the porosity is from 30 to 60%, preferably from 40 to 50%. Where such a discrete anode is provided between the membrane and the substrate, it will be appreciated that in such cases the membrane is supported indirectly by the substrate. Generally in such cases the anode layer is deposited on the substrate, and then the membrane layer deposited onto the anode layer. Various techniques are known in the art, including those descried elsewhere herein, for producing thin film layers onto substrates of various kinds.

As noted above, a thin layer (generally 10 to 100 μm, preferably 30 to 50 μm) of the substrate support itself may conveniently function as the anode of the electrolytic apparatus, (where the substrate material is electrochemically active), and is connected to the voltage supply via a porous metal current collector in generally known manner A porous cathode requires generally to be sufficiently porous to facilitate exit of hydrogen molecules from the membrane. In general therefore the pore size should be not less than 0.5 μm, and conveniently from 0.5 to 10 μm. Desirably the porosity is from 30 to 60%, preferably from 40 to 50%. The cathode may be provided on the surface of the membrane electrolyte by painting, screen printing or sol-gel coating, and is connected to the voltage supply via a porous metal current collector in generally known manner. Suitable cathodes are conveniently of a transition metal such as porous metallic platinum or palladium, or a Ni cermet of a transition metal and a proton conducting electrolyte. Various mixed conducting oxides which may also be used, are known in the art including perovskite oxide materials such as those disclosed in WO2004/013925.

One of the benefits of the invention is that the lower working temperatures allow the use of less expensive current collector metals such as steel, which may, if desired, be provided with electrically conducting protective film coatings, e.g. of chromium.

(as well as avoiding the use of expensive precious metal catalysts etc).

The substrate supported membrane, electrode, and current collector, assembly may be electrically insulated from the gas supply and exhaust pipes and any external housing, which are generally made of metal e.g. steel, by means of a high temperature glass ceramic such as barium silicate or a high temperature cement.

As indicated above the steam electrolysis may be carried out at a range of different temperatures. It will also be understood that higher temperatures have the advantage of reducing the direct electrical energy input required. It is, however, a key feature of the present invention that it allows the use of lower temperatures than have been used heretofore in steam electrolysis, which in turn allows the use of significantly more economic materials and forms of construction. It is also important to avoid using higher temperatures as these can result in oxide ion conductivity developing in the membrane and even permeability to water molecules. Preferably there is used an operating temperature of from 400 to 800° C., most preferably from 500 to 700° C.

In general it is convenient to use a steam supply at a temperature substantially equal to the desired operating temperature at the membrane. It is also possible though to supply steam at a lower temperature and to heat the substrate supported membrane, e.g. using an external electrical or fuel gas (conveniently hydrogen), furnace.

It will also be understood that the voltage required to be applied across the membrane for a given hydrogen flux will depend on the electrical resistance of the membrane, and any supporting substrate employed. The electrical resistance will in turn depend on the particular materials used, as well as the thickness thereof, and the operating temperature used. It is accordingly desirable that the membrane should be as thin as is reasonably practicable i.e. whilst still maintaining gas tightness and structural integrity under the operating conditions used. Typically we have found that useful levels/rates of electrolysis may be obtained with an applied voltage of the order of 1.1 to 1.2 V when using a proton conducting ($BaCe_{0.9}Y_{0.1}O_{2.95}$, $Ba_3Ca_{1.18}Nb_{1.82}O_{8.73}$, etc) membrane having a thickness of around 25 µm.

The feed stream may be supplied to the electrolysis apparatus at ambient pressure. Steam generators, though, generally provide steam at super-atmospheric pressures and the use of such higher pressures—typically up to 10 bar or even 100 bar—has the advantage of increasing efficiency.

The steam feed stream is generally supplied to the module via piping connected to the module so that the feed stream is passed across the surface of the substrate and undissociated steam together with oxygen produced are then carried away. At the cathode side, hydrogen gas produced is also generally exhausted by suitable piping. The piping (and conveniently also any external support such as a manifold or housing, for the substrate-supported membrane) may be made of any material known in the art but may conveniently be of steel or alumina, or the like.

The steam feed stream is generally contacted with the substrate support, by passing a flow thereof across the exposed surface thereof.

BRIEF DESCRIPTION OF THE DRAWINGS

Further preferred features and advantages of the present invention will appear from the following detailed description given by way of example of some preferred embodiments described with reference to the accompanying drawings in which.

DETAILED DESCRIPTION OF THE DRAWINGS

Figure 1:
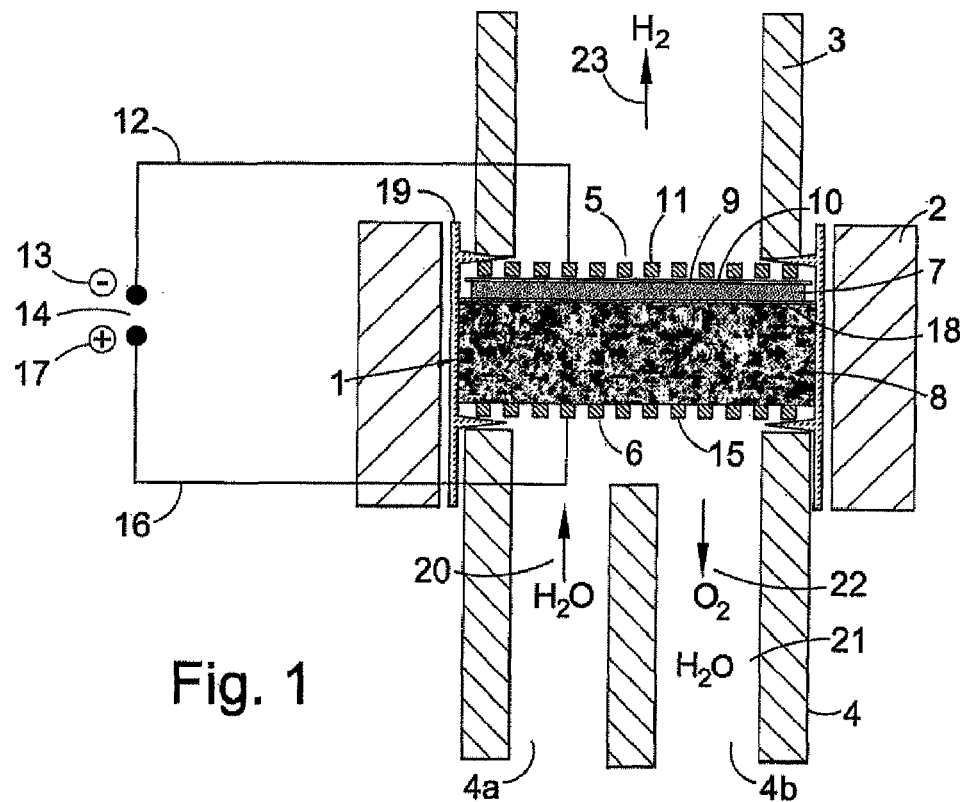
FIG. 1 is a schematic section through a steam electrolyser module of the invention.

FIG. 1 shows a steam electrolyser module 1 of the invention mounted in a manifold 2 and coupled to gas flow pipes 3,4 at cathode and anode sides 5,6 thereof, respectively. In more detail, the module 1 comprises a 5 µm thick dense non-porous proton-conducting membrane 7 of BCY10 or BCN18 deposited on a 2 mm thick LSM substrate 8 having a 40% porosity and a pore size generally in the range of from 0.5 to 10 µm.

On the outer face 9 of the membrane 7 (remote from the substrate support 8) is provided a porous metallic platinum cathode or hydrogen electrode 10, on top of which is provided a steel mesh current collector 11 connected 12 to the negative pole 13 of a DC voltage supply 14. At the anode side outer face 6 of the substrate 8 is provided a steel mesh current collector 15 connected 16 to the positive pole 17 of the DC voltage supply 14 so that a positive voltage is applied to a thin (30 µm thick) layer 18 of the substrate 8 adjacent the membrane 7, which functions as an anode or steam electrode. The module 1 is electrically insulated from the steel manifold 2 and pipes 3,4 by a high temperature barium silicate glass ceramic seal 19.

The anode side pipe 4 has an inlet branch 4a through which high temperature steam 20 is fed in and passed across the exposed anode side outer face 6 of the substrate 8. Any undissociated steam 21, together with oxygen 22 produced by the electrolytic dissociation of the steam feed, are exhausted by an outlet branch 4b of the anode side pipe 4. The cathode side pipe 3 is used to exhaust hydrogen gas 23 liberated at the cathode 10.

Figure 2:
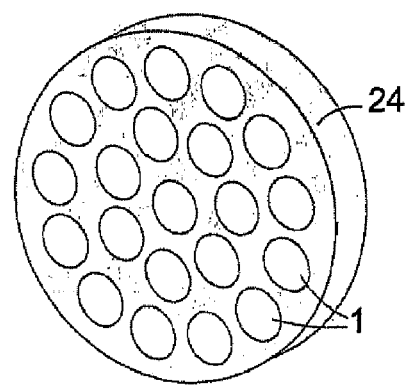
FIG. 2 is a schematic perspective view of a manifold interconnector for a multi-module electrolyser.

In use of the above module the following processes occur:

at the anode $2H_2O \rightarrow 4H^+ + O_2 + 4e^-$ at the cathode $4H^+ + 2e^- \rightarrow 2H_2$ FIG. 2 shows part of a large scale steam electrolyser comprising a manifold interconnector 24 mounting multiple modules 1 such as those of FIG. 1.

Example 1

Preparation of Proton Conducting Membrane Material

A nominal $BaZr_{0.8}Y_{0.2}O_{2.9}$ powder was prepared by a solid state reaction method. For example, 9.8675 g $BaCO_3$, 4.9288 g $ZrO_2$ and 1.1291 g $Y_2O_3$ powders were dried at 500-700° C. before mixing together and ball-milling in a zirconia container with zirconia balls. The mixture was fired at 1400° C. for 10 hours.

The required amount of sintering aid was mixed together with as-fired powder, ball-milled for 15 minutes twice, then pressed into pellets having a diameter of 13 mm, before firing at 1350° C. Pure ZnO was used as the sintering aid and a dense $BaZr_{0.8}Y_{0.2}O_{2.9}$ pellet was obtained. To minimise the effect of addition of ZnO on the other properties such as its conductivity, the amount of ZnO added was kept to a minimum. Less than 1 wt % of ZnO, however, would require a higher temperature in order to effectively sinter the $BaZr_{0.8}Y_{0.2}O_{2.9}$ pellets.

With the addition of only 1 w/w % ZnO, $BaZr_{0.8}Y_{0.2}O_{2.9}$ pellets may be readily sintered at a temperature as low as 1350° C. A relative density of 96% was obtained after firing the $BaZr_{0.8}Y_{0.2}O_{2.9}$ pellets at 1350° C. for 10 hours with addition of 1 wt % ZnO. For comparison, pellets pressed from 1400° C./10 h $BaZr_{0.8}Y_{0.2}O_{2.9}$ powder without any ZnO, were also fired at 1350° C. for 10 hours together with the pellets with 1 wt % ZnO sintering aid. The latter were found to have a much lower relative density of only around 68% and cracked into powders after exposure to air for just a few days.

Example 2

Preparation of Membrane Material Using Direct Solid State Reaction to Incorporate Zinc into the Lattice $BaCe_{0.5}Zr_{0.3}Y_{0.16}Zn_{0.04}O_{2.88}$ was prepared using 9.8675 g $BaCO_3$, 4.3030 g $CeO_2$, 1.8483 g $ZrO_2$, 0.9032 g $Y_2O_3$ and 0.1627 g ZnO, which were mixed together and ball-milled at high speed in zirconia container with zirconia balls for 15 minutes twice with addition of acetone. The mixture was dried to remove the acetone, then pre-fired at 1100° C. for 2 hours. The as-fired powders were pressed into pellets 13 mm in diameter or fired at 1300° C. for 10 hours. Dense pellets with relative density over 96% were obtained by this process. This Example shows that $BaCe_{0.5}Zr_{0.3}Y_{0.16}Zn_{0.04}O_{3-\delta}$ was fully sintered at 1300° C. by introducing a small amount of zinc at the B-site and that ZnO is an effective sintering aid for low temperature sintering of $BaCeO_3$ and $BaCe(Zr)O_3$-based perovskites.

Example 3

Properties of Membrane Material

Figure 3:
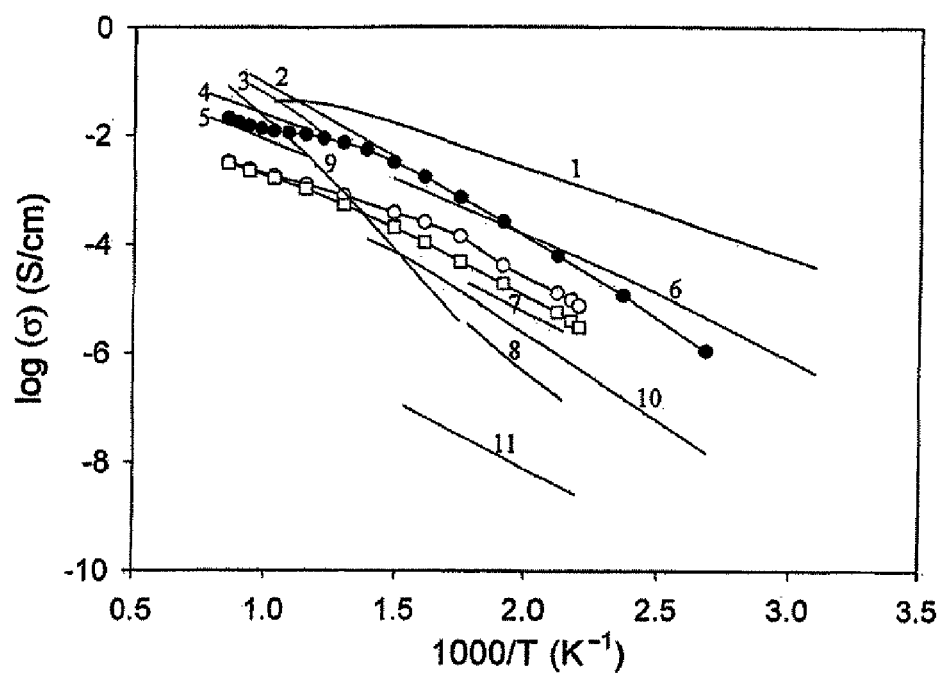
FIG. 3 is a plot showing variations of conductivity with temperature for various membrane materials for use in steam electrolysers.
Figure 4:
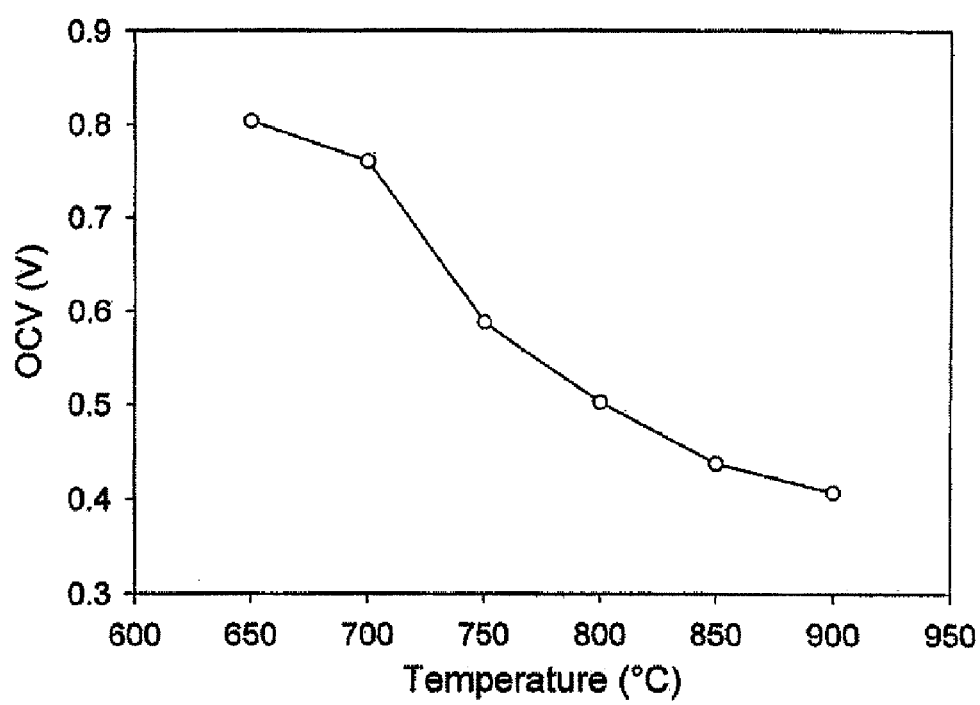
FIG. 4 is a plot showing the temperature dependence of open circuit voltage of a cell having a membrane comprising $BaCe_{0.5}Zr_{0.3}Y_{0.16}Zn_{0.04}O_{3-\delta}$.

The conductivity of the material obtained in Example 2 was measured by ac impedance spectroscopy and the total conductivity found to compare favourably with previous data as shown in FIG. 3. Specifically, FIG. 3 illustrates an example of a comparison of conductivity of ionic conductors. A pellet of the material (thickness 1.453 mm) was investigated in a concentration cell with platinum electrodes between hydrogen and oxygen passing through room temperature water. The open circuit potential using the above described membrane material decreased with increasing temperature as oxide transport started to compete with proton conduction as shown in FIG. 4. Specifically, FIG. 4 illustrates an example of an open circuit voltage (OCV) of a BCZZY cell. This is expected behaviour for an intermediate temperature proton conductor.
Key to FIG. 3
(1) $BaZr_{0.8}Y_{0.2}O_{2.9}$ bulk (deduced) [1];
(2) $Ce_{0.8}Gd_{0.2}O_{1.9}$ [2];
(3) $a_{0.9}Sr_{0.1}Ga_{0.8}Mg_{0.2}O_{2.95}$ [3];
(4) $BaCe_{0.9}Y_{0.1}O_{2.95}$ [4];
(5) $BaCe_{0.5}Zr_{0.4}Y_{0.1}O_{2.95}$ [4];
(6) $BaZr_{0.8}Y_{0.2}O_{2.9}$ total [5];
(7) $BaZr_{0.9}Y_{0.1}O_{2.95}$ bulk [6];
(8) $BaZr_{0.9}Y_{0.1}O_{2.95}$ total [6];
(9) $Y_{0.15}Zr_{0.85}O_{2-\delta}$(YSZ) [2];
(10) $BaCe_{0.7}Zr_{0.2}Nd_{0.1}O_{3-\delta}$[7];
(11) $BaZr_{0.8}Y_{0.2}O_{2.9}$ film total [8];
○$Ba_{0.97}Zr_{0.77}Y_{0.19}Zn_{0.04}O_{3-\delta}$bulk in wet 5%H2;
□$Ba_{0.97}Zr_{0.77}Y_{0.19}Zn_{0.04}O_{3-\delta}$total in wet 5%H2;
●$BaCe_{0.5}Zr_{0.3}Y_{0.16}Zn_{0.04}O_{3-\delta}$total in wet 5%H2.

Example 4

Figure 5:
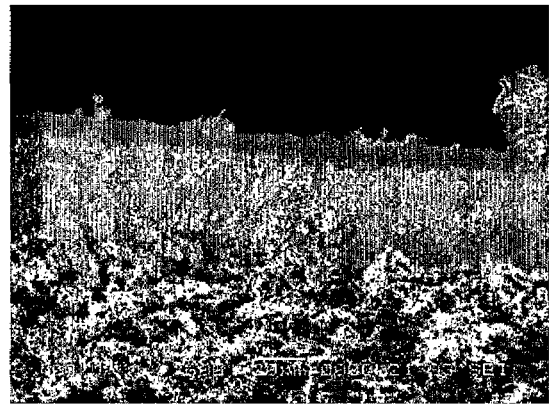
FIG. 5 is an electron scanning micrograph of a cross section through a membrane and substrate structure for use with a steam electrolyser of the invention.

Fabrication of a Dense Proton Conducting Thin Film Membrane on a Porous Substrate Porous $La_{0.8}Sr_{0.2}MnO_3$ (LSM) substrates were prepared by tape casting. The liquid mixture used for tape casting consists of commercial submicron-size LSM powder (Praxair), graphite powder used as pore former, a (3:1) mixture of methyl ethyl ketone and ethanol as solvent, polyethylene glycol and di-n-butyl phtalate as dispersant and plasticizer, respectively and polyvinyl butyral resin binder (commercially available as Butvar®B-98). The mixture comprising powder, solvent (1:1 mixture to the powder) and pore former (40 wt %) was ball milled overnight on a roller ball mill using zirconia balls for breaking the agglomerates and reducing the particle size. The organic additives (dispersant, plasticizer and binder, also 40wt % referring to LSM) were then added and the slurry was mixed in an electrical shaker for half an hour. The organic additives are meant to increase the viscosity of the slurry and to add strength and flexibility to the green tape. A subsequent ball milling for 4 hours is performed for homogenization of the slurry. The slurry was then used for green tape deposition using a tape casting machine and the resultant dried tapes were cut, overlapped and cut into 2.5 cm diameter disks. The disks were then fired with a slow ramp rate of 0.5° C. to 1000° C. for burning the organic residues, kept there for 5 hours and then fired to 1300° C. for sintering and increasing the mechanical strength. The 2 cm diameter porous LSM disks presents around 50% porosity and a rather uniform distribution of micron size pores within the structure. In most of the cases, a thin layer of $La_{0.8}Sr_{0.2}Cr_{0.5}Mn_{0.5}O_{3-x}$ (LSCM) as a buffering layer was deposited by spray coating to prevent the reaction between the LSM substrate and $BaCe_{0.5}Zr_{0.3}Y_{0.16}Zn_{0.04}O_3$-(BCZZY) electrolyte. The slurry used for spraying was prepared in a similar manner as above, increasing the amount of solvent used. The as prepared substrates are placed on a hot plate and held at about 300-350° C. while about 10 ml of electrolyte suspension (2 g BCZZY ultrasonically dispersed in a mixture containing 35 ml ethanol) was sprayed onto the substrate using an airbrush. During deposition it must be ensured that the suspension hits the surface of the substrate while wet, allowing the remaining solvent to wick into the porous substrate before evaporation and avoiding solution pooling. The green bilayer is then sintered to 1325-1350° C. for 5 hours using an alumina disk placed on top of the eletrolyte to ensure flatness of the assembly. The resulted structure was a porous LSM substrate deposited with a less porous, very thin layer of LSCM and a dense film of BCZZY of approximately 10-40 microns thickness. An electron scanning micrograph of a cross section through a sample of the structure is shown in FIG. 5. Specifically, FIG. 5 illustrates an example of a membrane cross-section.

Example 5

Laboratory Test of a Steam Electrolyser Assembly with a BCZZY Membrane

An LSM-BCZZY substrate-membrane assembly generally similar to that illustrated in FIG. 1 was prepared by tape-casting (substrate) and spray-coating (membrane) as described in Example 4 above. The BCZZY-membrane was about 40 μm thick and was provided with a porous Palladium Cathode. At the Anode there was provided a Platinum mesh Anode/current collector. The steam feed stream (to the Anode) used a pure oxygen supply as a carrier for the steam in order to avoid possible contamination of the cell components.

The steam partial pressure of the steam feed stream gas was controlled by bubbling the gas through a water bath that was kept at ambient temperature in this instance achieving a steam partial pressure of 0.022 bar and providing a gas composition of 2.2 vol % $H_2O$ and 97.8 vol % $0_2$, to the Anode. A gas mixture comprising hydrogen and argon was similarly bubbled through ambient water to supply a gas having a composition of 2.2 vol % $H_2O$, 5 vol % $H_2$ and 92.8 vol % Ar to the cathode. Each of the gas flows was typically adjusted to 200 ml/cm$^3$.

Figure 6:
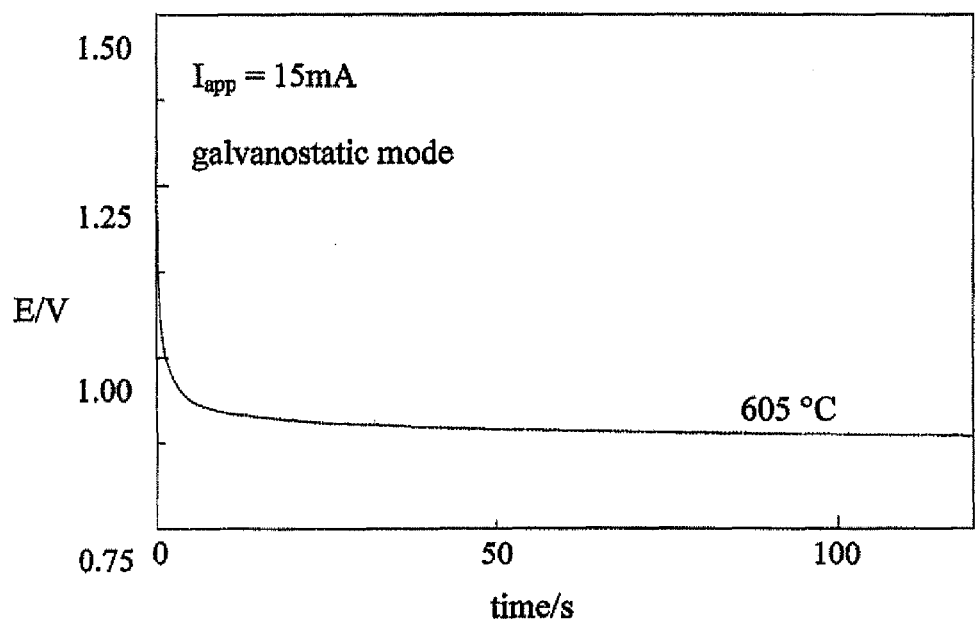
FIG. 6 is a plot of a change in potential with time of an electrolyser cell of the invention when operated in a galvanostatic mode.

The amount of hydrogen produced was determined from the potential on a zirconia oxygen sensor using the Nernst equation and the water dissociation equilibrium constant as detailed below in equations (1) and (2). The zirconia oxygen sensor was positioned in the exit gas flow and was kept at T=766° C. At zero applied current and an electrolysis cell temperature of 605° C., the gas partial pressures in the gas mixture were pO2=1.125 ×10-20 bar, pH2O=0.0223 bar and pH2=0.0496 bar (at 766° C.). When a constant current of 15 mA was applied to the electrolysis cell, the change in potential, E, of the cell is shown in FIG. 6. Specifically, FIG. 6 illustrates an example of a measurement of change in gas composition. From the voltage output, EMF, of the zirconia sensor, and using equations (1) and (2) below, it was calculated that pO2 decreased to 9.840×10-21 bar, which corresponded to an increase of pH2 to 0.0531 bar and a conversion of ca. 16% of the steam that was contained in the gas mixture supplied to the anode, to hydrogen gas released at the cathode.

$$EMF=(RT/4F)\log_e(P1(O2)/P2(O2)) \quad (1)$$

$$Kf=p(H2O)/(p(H2)\cdot(p(O2))^{1/2}) \quad (2)$$

wherein E, R, T, and F represent cell voltage, the Gas constant, temperature and the Faraday constant, respectively and Kf is the thermodynamic equilibrium constant for the dissociation of water to hydrogen and oxygen, $H2O \leftrightarrow H2+O2$.

References (for FIG.3)

[1] Kreuer K D, Aspects of the formation and mobility of protonic charge carriers and the stability of perovskite-type oxides SOLID STATE IONICS 125 (1-4): 285-302 OCT 1999.

[2] STEELE BCH, OXYGEN ION CONDUCTORS AND THEIR TECHNOLOGICAL APPLICATIONS MAT SCI ENG B-SOLID 13 (2): 79-87 Mar. 30 1992

[3] ISHIHARA T, MATSUDA H, TAKITA Y, DOPED LAGAO3 PEROVSKITE-TYPE OXIDE AS A NEW OXIDE IONIC CONDUCTOR, J AM CHEM SOC 116 (9): 3801-3803 May 4 1994

[4] Katahira K, Matsumoto H, Iwahara H, Koide K, A solid electrolyte steam sensor with an electrochemically sup- plied hydrogen standardusing proton-conducting oxides, SENSORS AND ACTUATORS B-CHEMICAL, 67 (1-2): 189-193 Aug. 10 2000.

[5] Bohn H G, Schober T, Electrical conductivity of the high-temperature proton conductor BaZr0.9Y0.1O2.95 J AM CERAM SOC 83 (4): 768-772 APR 2000.

[6] Snijkers F M M, Buekenhoudt A, Cooymans J, Luyten J J, Proton conductivity and phase composition in BaZr0.9Y0.1O3-delta, SCRIPTA MATERIALIA, 50 (5): 655-659 MAR 2004

[7] Ryu K H, Haile S M, Chemical stability and proton conductivity of doped BaCeO3-BaZrO3 solid solutions SOLID STATE IONICS 125 (1-4): 355-367 OCT 1999

[8] Schneller T, Schober T, Chemical solution deposition prepared dense proton conducting Y-doped BaZrO3 thin films for SOFC and sensor devices SOLID STATE IONICS 164 (3-4): 131-1366 NOV 2003.

The invention claimed is:

1. A method of producing hydrogen comprising: providing a steam feed stream at one side of a porous redox stable substrate, contacting said steam feed stream with a proton conducting membrane supported on the other side of said porous redox stable substrate, through said substrate, said membrane being substantially non-permeable to molecular gas and to oxide ions, applying a DC voltage across an anode coupled to the substrate side of said membrane and a cathode coupled to the other side of said membrane so as to dissociate at least part of said steam feed stream therebetween, into protonic hydrogen and oxygen at said anode, allowing said protonic hydrogen to pass through said membrane and form molecular hydrogen at said cathode, and collecting said molecular hydrogen, wherein the membrane comprises a material prepared with the use of a sintering aid comprising at least one of Zn doped oxide, $Al_2O_3$, $Bi_2O_3$ and/or an oxide of a first row transition element.

2. A method as claimed in claim 1 wherein steam electrolysis is carried out at a temperature of from 400 to 800° C.

3. A steam electrolyser apparatus for producing hydrogen, comprising: a dense proton-conducting membrane substantially non-porous to molecular gas, said membrane being supported on a gas permeable, chemically and mechanically stable, electronically conducting substrate, said membrane being coupled: at the substrate-supported side to an anode for connection to a positive voltage, and to a steam inlet and oxygen outlet for feeding a steam feed stream into said substrate and exhausting oxygen gas released therefrom; and at its other side to a cathode for connection to a negative voltage and a hydrogen gas outlet for exhaustion of hydrogen gas released at said cathode, wherein the membrane comprises a material prepared with the use of a sintering aid comprising at least one of Zn doped oxide, $Al_2O_3$, $Bi_2O_3$ and/or an oxide of a first row transition element.

4. An apparatus as claimed in claim 3 wherein the substrate material is electrochemically active and the anode constitutes part of the substrate adjoining the membrane.

5. An apparatus as claimed in claim 3 wherein the anode comprises a thin layer of a different material interposed between the membrane and the substrate support.

6. Apparatus as claimed in claim 3 wherein the proton conducting membrane comprises an oxygen deficient perovskite of formula $ABO_{3-\delta}$ wherein A and B represent metallic elements occupying the A and B sites of the perovskite lattice structure and δ represents the degree of oxygen deficiency.

7. Apparatus as claimed in claim 6 wherein said membrane material is selected from $BaCe_{0.9}Y_{0.1}O_{2.95}$ (BCY10) $BaZr_{0.9}Y_{0.1}O_{2.95}$ (BZY) and members of the solid solution, $BaCe_{0.9-x}Zr_xY_{0.1}O_{2.95}$ (BCZY), or the analogues of the previously mentioned phases with lanthanides such as Gd, Nd or Yb instead of Y and such phases with higher degrees of substitution such as $BaCe_{0.8}Y_{0.2}O_{2.95}$ (BCY20), $Sr_3CaZr_{0.5}Ta_{1.5}O_{8.75}$ (SCZTO) and $Ba_3Ca_{1.18}Nb_{1.82}O_{8.73}$ (BCN18) composites of such materials.

8. Apparatus as claimed in claim 3 wherein the membrane is provided with an outer protective layer.

9. Apparatus as claimed in claim 3 wherein the membrane thickness is not more than 25 μm.

10. Apparatus as claimed in claim 9 wherein the membrane thickness is from 3 to 15 μm.

11. Apparatus as claimed in claim 3 wherein the membrane comprises a $BaZrO_3$-based material.

12. Apparatus as claimed in claim 11 wherein said $BaZrO_3$ based material is prepared with the use of a sintering aid.

13. Apparatus as claimed in claim 12 wherein the membrane is of $BaZr_{1-x}Ln_xO_{3-X/2}$ wherein X has a value in the range from (0.02) to (0.25) and Ln is a lanthanide ion or La,Y,Sc, and wherein said membrane is produced with the use of approximately 1% w/w of ZnO sintering aid.

14. Apparatus as claimed in claim 12 wherein the membrane is of $BaCe_{0.5}Zr_{0.3}Y_{0.16}Zn_{0.04}O_{2.88}$.

15. Apparatus as claimed in claim 3, wherein the substrate support is of a material which comprises a metallised ceramic or a mixed conductive oxide, having an electrical conductivity of not less than $10 Scm^{-1}$ at the operating temperature of the steam electrolysis.

16. Apparatus as claimed in claim 15 wherein said substrate material is selected from $Cu:Al_sO_3$, $La_{0.8}Sr_{0.2}MnO_3$ (LSM), chromium-doped LSM (i.e. $La_{0.75}Sr_{0.25}Cr_{0.5}Mn_{0.5}O_3$) and $La_{0.6}Sr_{0.4}Co_{0.2}Fe_{0.8}O_{3-d}$ (LSCF).

17. Apparatus as claimed in claim 3 wherein the substrate support pore size is not less than 0.5 μm.

18. Apparatus as claimed in claim 3 wherein the substrate porosity is from 30 to 60%.

* * * * *